(12) United States Patent
Kinoshita

(10) Patent No.: US 11,503,656 B2
(45) Date of Patent: Nov. 15, 2022

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Yuichi Kinoshita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 17/125,791

(22) Filed: Dec. 17, 2020

(65) Prior Publication Data

US 2021/0105836 A1 Apr. 8, 2021

Related U.S. Application Data

(63) Continuation of application No. PCT/JP2019/023228, filed on Jun. 12, 2019.

(30) Foreign Application Priority Data

Jun. 21, 2018 (JP) .............................. JP2018-118135

(51) Int. Cl.
| | |
|---|---|
| *H04M 1/66* | (2006.01) |
| *H04M 1/68* | (2006.01) |
| *H04M 3/16* | (2006.01) |
| *H04W 76/10* | (2018.01) |
| *H04W 4/80* | (2018.01) |
| *H04W 12/033* | (2021.01) |

(Continued)

(52) U.S. Cl.
CPC ........ *H04W 76/10* (2018.02); *H04N 5/23206* (2013.01); *H04W 4/80* (2018.02); *H04W 8/005* (2013.01); *H04W 12/033* (2021.01)

(58) Field of Classification Search
CPC ....... H04W 76/10; H04W 4/80; H04W 8/005; H04W 12/033; H04W 76/11; H04N 5/23206; H04M 1/00
USPC ....................................................... 455/411
See application file for complete search history.

(56) References Cited

U.S. PATENT DOCUMENTS

| | | | |
|---|---|---|---|
| 2016/0021108 A1 | 1/2016 | Houston et al. | |
| 2017/0255423 A1* | 9/2017 | Yoshida | ................. G06F 3/1292 |
| 2019/0380161 A1* | 12/2019 | Song | ..................... H04W 84/18 |

FOREIGN PATENT DOCUMENTS

| | | |
|---|---|---|
| JP | 2007166538 A | 6/2007 |
| JP | 2016144025 A | 8/2016 |
| JP | 2017158124 A | 9/2017 |

* cited by examiner

*Primary Examiner* — Tanmay K Shah
(74) *Attorney, Agent, or Firm* — Canon U.S.A., Inc. IP Division

(57) ABSTRACT

There is provided a communication apparatus. A first communication unit receives an advertise signal from an external apparatus. A second communication unit wirelessly communicates with the external apparatus by using a predetermined protocol. A control unit determines whether the external apparatus supports the predetermined protocol on the basis of the advertise signal from the external apparatus. If it is determined that the external apparatus does not support the predetermined protocol, the control unit performs control so that a request to start encrypted communication is sent to the external apparatus via the first communication unit. If it is determined that the external apparatus supports the predetermined protocol, the control unit performs control so that a request to start unencrypted communication is sent to the external apparatus via the first communication unit.

17 Claims, 14 Drawing Sheets

(51) Int. Cl.
*H04N 5/232* (2006.01)
*H04W 8/00* (2009.01)

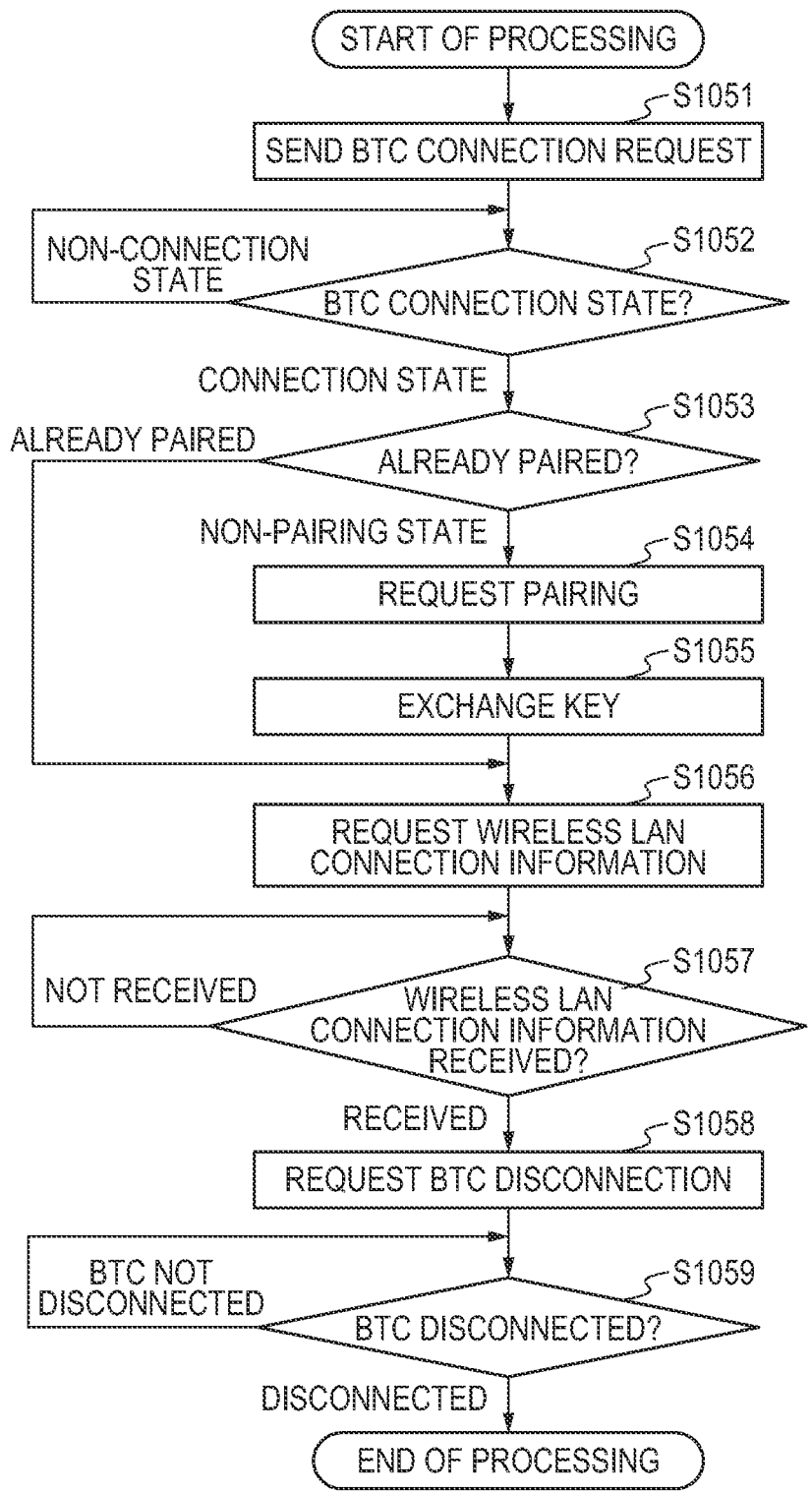

COMMUNICATION APPARATUS, METHOD FOR CONTROLLING COMMUNICATION APPARATUS, AND STORAGE MEDIUM

CROSS-REFERENCE TO RELATED APPLICATIONS

This application is a Continuation of International Patent Application No. PCT/JP2019/023228, filed Jun. 12, 2019, which claims the benefit of Japanese Patent Application No. 2018-118135, filed Jun. 21, 2018, both of which are hereby incorporated by reference herein in their entirety.

BACKGROUND OF THE INVENTION

Field of the Invention

The present invention relates to an image capturing apparatus capable of being connected to another apparatus and a method for controlling the image capturing apparatus.

Background Art

In recent years, it has been known that mobile communication apparatuses, such as digital cameras and mobile phones, are equipped with a short-range wireless communication function, such as Bluetooth (registered trademark), so as to wirelessly communicate with other apparatuses. Bluetooth communication can be divided into two types of categories: so-called Bluetooth Classic (BTC) (Bluetooth Ver. 1.0 to 3.0) and Bluetooth Low Energy (BLE) (Bluetooth Ver. 4.0 or later). Because BLE consumes less power than BTC, BLE is sometimes used for a communication channel to remotely activate other communication. For example, Japanese Patent Laid-Open No. 2016-144025 describes a digital camera that is equipped with both a wireless LAN and BLE and that activates the wireless LAN when triggered by a particular communication via BLE.

However, in terms of the use of BLE described above, it is more convenient not to use encryption in favor of easy connection. In contrast, there are usage scenes in which more secure communication is desired, such as usage scenes in which the communication parameters of a wireless LAN are shared, for example.

CITATION LIST

Patent Literature

PTL1: Japanese Patent Laid-Open No. 2016-144025

SUMMARY OF THE INVENTION

In order to solve the above problem, a communication apparatus according to the present invention is comprising: a first communication unit configured to receive an advertise signal from an external apparatus; a second communication unit configured to wirelessly communicate with the external apparatus by using a predetermined protocol; and a control unit configured to determine whether the external apparatus supports the predetermined protocol on the basis of the advertise signal from the external apparatus, wherein if it is determined that the external apparatus does not support the predetermined protocol, the control unit performs control so that a request to start encrypted communication is sent to the external apparatus via the first communication unit, and wherein if it is determined that the external apparatus supports the predetermined protocol, the control unit performs control so that a request to start unencrypted communication is sent to the external apparatus via the first communication unit.

Further features of the present invention will become apparent from the following description of exemplary embodiments with reference to the attached drawings.

BRIEF DESCRIPTION OF THE DRAWINGS

FIG. 10B is a flowchart illustrating the operation of the smartphone when it connects to a camera in accordance with connection procedure 2 according to the first embodiment.

DESCRIPTION OF THE EMBODIMENTS

Embodiments according to the present invention are described in detail below with reference to the accompanying drawings.

Note that the embodiments described below are only examples of means for implementing the present invention and may be modified or changed as needed in accordance with the configuration of the apparatus to which the invention is applied and a variety of conditions. In addition, the embodiments can be combined in any way as needed.

First Embodiment

<Configuration of Digital Camera 100>

Figure 1:
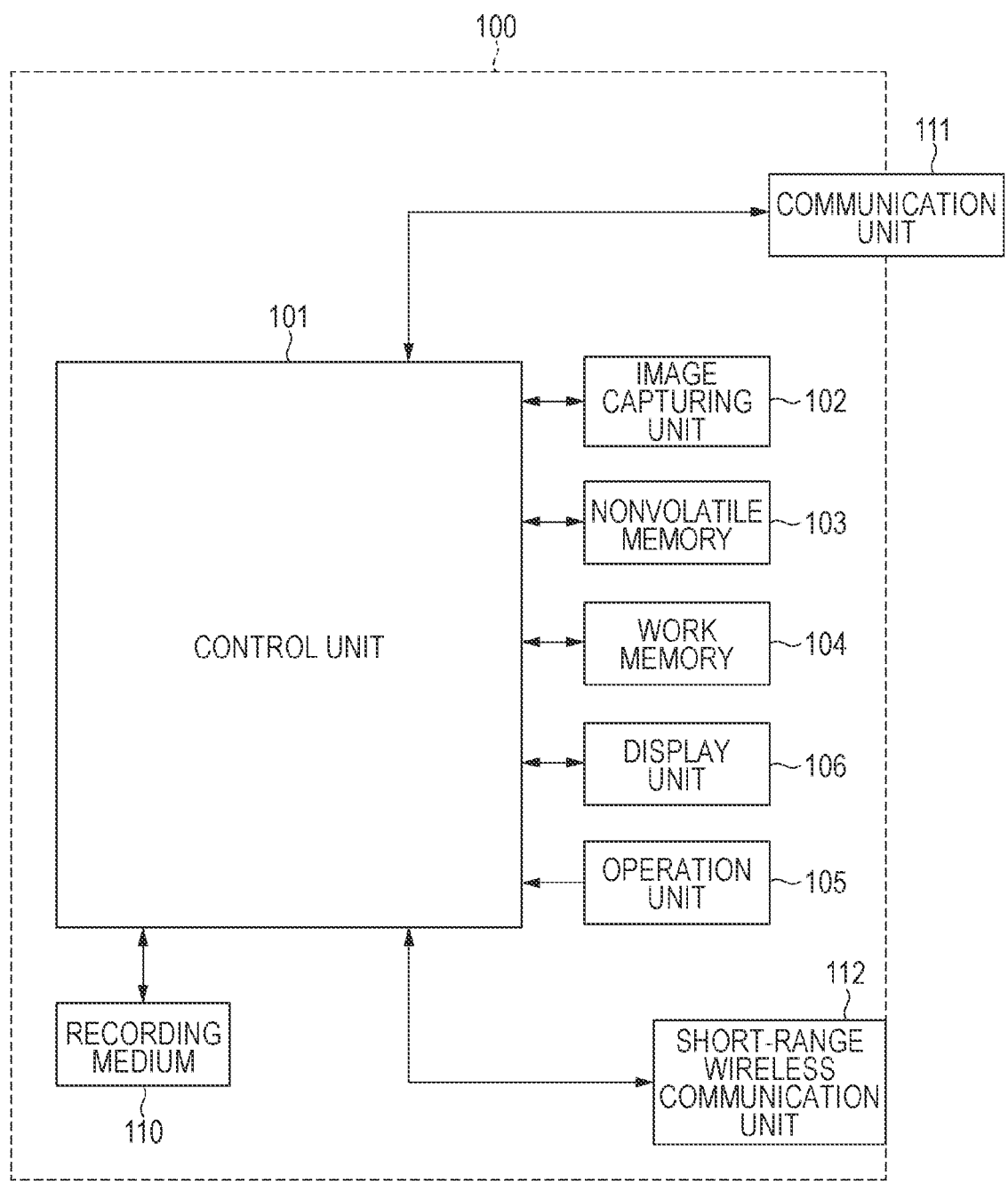
FIG. 1 is a block diagram illustrating the configuration of a digital camera according to a first embodiment.

FIG. 1 is a block diagram illustrating a configuration example of a digital camera 100, which is an example of an image capturing apparatus according to the present embodiment. While a digital camera is described herein as an example of an image capturing apparatus, the image capturing apparatus is not limited thereto. For example, the image capturing apparatus may be a portable media player, a so-called tablet device, or an information processing apparatus such as a personal computer.

The control unit 101 controls each of units of the digital camera 100 in accordance with input signals and a program described below. Note that instead of the control unit 101 controlling the entire apparatus, a plurality of pieces of hardware may share the processing so as to control the entire apparatus.

An image capturing unit 102 includes, for example, an optical lens unit, an optical system for controlling aperture, zooming, focusing, and the like, and an image sensor for converting light (an image) introduced through the optical lens unit into an electrical image signal. Typically, CMOS (Complementary Metal Oxide Semiconductor) or CCD (Charge Coupled Device) is used as the image sensor. Under the control of the control unit 101, the image capturing unit 102 uses the image sensor to convert, into an electrical signal, the light received from the subject and formed into an image by the lens included in the image capturing unit 102, performs noise reduction processing and the like, and outputs digital data as image data. In the digital camera 100 according to the present embodiment, the image data is recorded on a recording medium 110 in accordance with the DCF (Design Rule for Camera File System) standard.

A nonvolatile memory 103 is an electrically erasable and recordable nonvolatile memory, which stores programs and the like (described below) to be executed by the control unit 101.

A work memory 104 is used as a buffer memory that temporarily hold image data captured by the image capturing unit 102, an image display memory for a display unit 106, and a work area of the control unit 101, and the like.

An operation unit 105 is used to receive an instruction sent from a user to the digital camera 100. The operation unit 105 includes, for example, a power switch used by a user to instruct the digital camera 100 to power on (or off), a release switch used to instruct the digital camera 100 to capture an image, a moving image recording switch used to instruct the digital camera 100 to capture a moving image, and a playback button used to instruct the digital camera 100 to play back image data. Furthermore, the operation unit 105 includes operation members, such as a dedicated connection button for initiating communication with an external apparatus via a communication unit 111 (described below). In addition, a touch panel formed in the display unit 106 (described below) is included in the operation unit 105. Note that the release switch has SW1 and SW2. When the release switch is half-pressed, the SW1 is switched on. Thus, the operation unit 105 receives an instruction for preparing image capture, such as AF (auto focus) processing, AE (auto exposure) processing, AWB (auto white balance) processing, EF (flash pre-flash) processing, and the like. In addition, when the release switch is fully pressed, the SW2 is switched on. Thus, the operation unit 105 receives an instruction to capture an image.

The display unit 106 displays a viewfinder image during image capture, displays the captured image data, and displays text for interactive operation. Note that the display unit 106 does not necessarily need to be included in the digital camera 100. The digital camera 100 only need to be connected to an internal or external display unit 106 and have at least a display control function to control information displayed on the display unit 106.

The recording medium 110 can record the image data output from the image capturing unit 102. The recording medium 110 may be configured to be removable from the digital camera 100 or may be built in to the digital camera 100. That is, the digital camera 100 only need to have at least means for accessing the recording medium 110.

The communication unit 111 is an interface for connection with an external apparatus. The digital camera 100 according to the present embodiment can exchange data with an external apparatus via the communication unit 111. For example, the image data generated by the image capturing unit 102 can be transmitted to an external apparatus via the communication unit 111. Note that according to the present embodiment, the communication unit 111 includes an interface for communication with an external apparatus via a so-called wireless LAN in accordance with the IEEE 802.11 standard. The control unit 101 achieves wireless communication with an external apparatus by controlling the communication unit 111. Note that the communication method is not limited to the wireless LAN. For example, the communication method includes an infrared communication method.

A short-range wireless communication unit 112 includes, for example, an antenna for wireless communication, and a modulation and demodulation circuit and a communication controller for processing a wireless signal. The short-range wireless communication unit 112 outputs a modulated wireless signal from the antenna and demodulates a wireless signal received by the antenna to achieve short-range wireless communication in accordance with the IEEE802.15 standard (so-called Bluetooth).

In addition, the short-range wireless communication unit 112 can perform both Bluetooth version 4 or later (so-called BLE) and Bluetooth versions 1 to 3 (so-called Bluetooth Classic, hereinafter also referred to as BTC) communications in a parallel way. BLE has a slower communication speed and lower power consumption than BTC. In addition, BTC has a slower communication speed and lower power consumption than wireless LAN. These Bluetooth communications have a narrower communicable range (that is, a shorter communicable distance) than wireless LAN communication. In addition, BLE and BTC communications are not compatible with each other and can communicate in a parallel way. In addition, in BLE connection, the digital camera 100 acts as a peripheral apparatus. That is, the digital camera 100 periodically sends out an advertise.

The digital camera 100 enters a sleep state when the power switch of the operation unit 105 is set to off. When the power switch is off and, thus, the digital camera 100 is in the sleep state and if the operation unit 105 is operated to switch on the power switch, the digital camera 100 returns from the sleep state. Alternatively, if a certain period of time elapses without operating the digital camera 100 with the power switch switched on, the digital camera 100 automatically enters a sleep state to save power. The function that performs this operation is called an auto power off function. In addition, the sleep state transitioned by the auto power off function is also referred to as an auto power-off state. In the auto power-off state, the camera returns from the sleep state when the operation unit 105 is operated to operate the release switch or playback button.

In addition, when the digital camera 100 is in the sleep state and if a smartphone 200 is operated, the digital camera 100 makes a Bluetooth connection with the smartphone 200 and then resumes from the sleep state. For example, when the digital camera 100 is fixed on a tripod or the like to capture an image by remote control, the digital camera 100 can be left with the power switch on and, thereafter, enter a sleep state. At this time, if a user operates the smartphone 200 at any desired point in time, the digital camera 100 can return from the sleep state, so that the user can capture an image. In addition, if the user leaves the digital camera 100 without use after capturing an image, the digital camera 100 is automatically switched off again and can enter the sleep state. In this case, when the user does not capture an image, the digital camera 100 is in a sleep state so as not to consume unnecessary power.

<Configuration of Smartphone 200>

Figure 2:
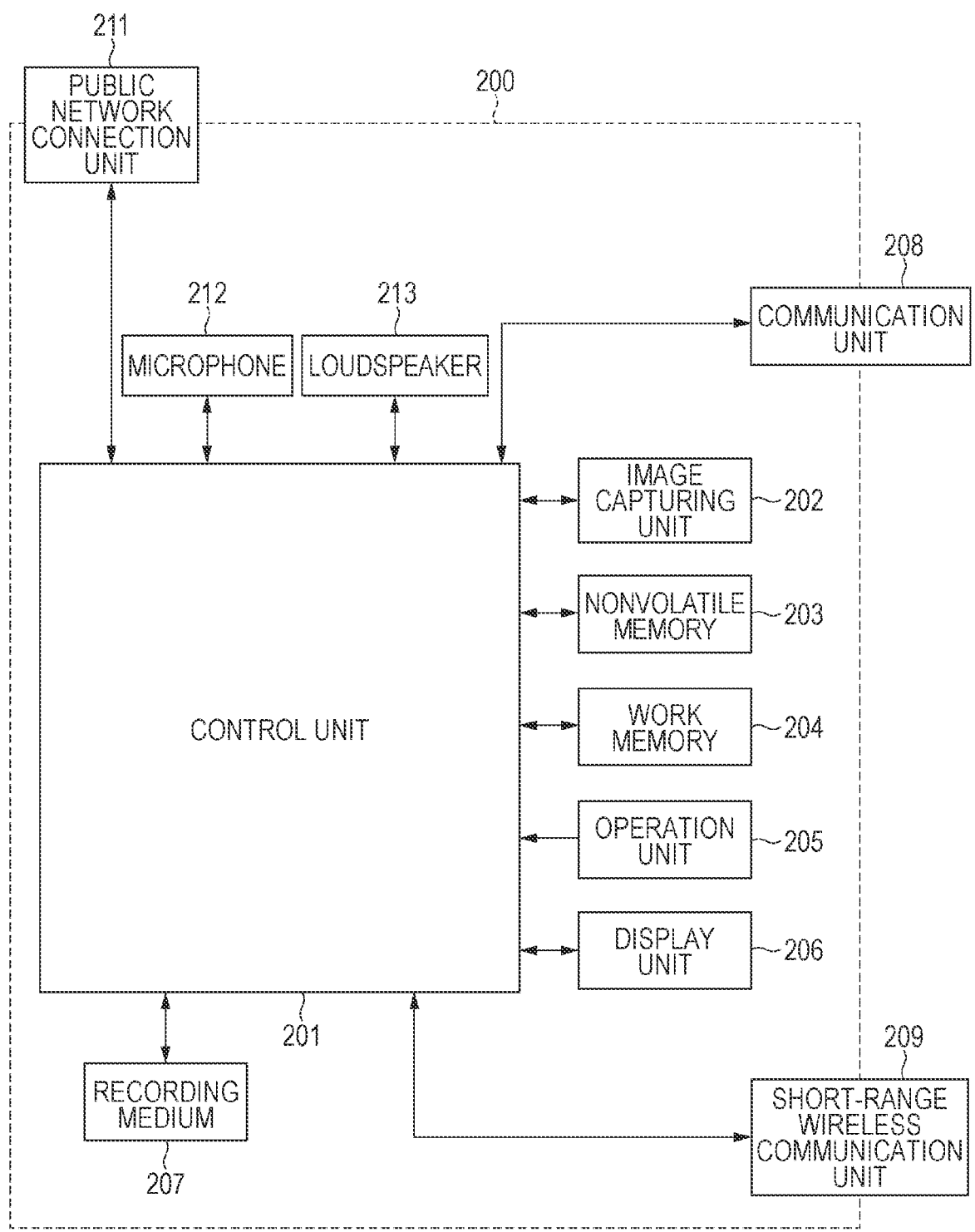
FIG. 2 is a block diagram illustrating the configuration of a smartphone according to the first embodiment.

FIG. 2 is a block diagram illustrating a configuration example of the smartphone 200, which is an example of the information processing apparatus according to the present embodiment. While a smartphone is described herein as an example of an information processing apparatus, the information processing apparatus is not limited to a smartphone. For example, the information processing apparatus may be, for example, a digital camera, a tablet device, or a personal computer with a wireless function.

A control unit 201 controls each of units of the smartphone 200 in accordance with an input signal and a program (described below). Note that instead of the control unit 201 controlling the entire apparatus, a plurality of pieces of hardware may share the processing so as to control the entire apparatus.

An image capturing unit 202 converts, into an electrical signal, the light received from a subject and formed into an image by a lens included in the image capturing unit 202, performs noise reduction processing and the like, and outputs the digital data as image data. The captured image data is stored in the buffer memory and, thereafter, is subjected to predetermined calculation by the control unit 201. The image data is recorded on a recording medium 207.

The nonvolatile memory 203 is an electrically erasable and recordable nonvolatile memory. The nonvolatile memory 203 has, recorded therein, an OS (operating system), which is the basic software to be executed by the control unit 201, and applications that work with the OS to achieve applicative functions. According to the present embodiment, the nonvolatile memory 203 stores an application (hereinafter referred to as APP) for communicating with the digital camera 100. In the following description, when the smartphone 200 and the control unit 201 operate, each unit is controlled by the OS and the APP that work in collaboration.

A work memory 204 is used as an image display memory used by a display unit 206, a work memory of the control unit 201, and the like.

An operation unit 205 is used to receive an instruction to the smartphone 200 from the user. The operation unit 205 includes operation members, such as a power switch used by a user to instruct the smartphone 200 to power on (or off) and a touch panel formed in the display unit 206.

The display unit 206 displays image data and displays text for interactive operations, and the like. Note that the display unit 206 does not necessarily need to be provided in the smartphone 200. The smartphone 200 only need to be connected to the display unit 206 and have at least a display control function to control information displayed on the display unit 206.

The recording medium 207 can record the image data output from the image capturing unit 202. The recording medium 207 may be configured to be removable from the smartphone 200 or may be built in to the smartphone 200. That is, the smartphone 200 only need to have means for accessing the recording medium 207.

A communication unit 208 is an interface for connection with an external apparatus. The smartphone 200 according to the present embodiment is capable of exchanging data with the digital camera 100 via the communication unit 208. According to the present embodiment, the communication unit 208 is an antenna, and the control unit 201 can be connected to the digital camera 100 via the antenna. Note that for connection with the digital camera 100, the connection may be made directly or via an access point. As a protocol for communicating data, for example, PTP/IP (Picture Transfer Protocol over Internet Protocol) via a wireless LAN can be employed. Note that the communication with the digital camera 100 is not limited thereto. For example, the communication unit 208 can include a wireless communication module, such as an infrared communication module or WirelessUSB. Furthermore, wired connection, such as a USB cable, HDMI (registered trademark), or IEEE1394, may be employed.

A short-range wireless communication unit 209 includes, for example, an antenna for wireless communication, and a modulation and demodulation circuit and a communication controller for processing a wireless signal. The short-range wireless communication unit 209 achieves short-range wireless communication in accordance with the IEEE802.15 standard by outputting a modulated wireless signal from the antenna and demodulating a wireless signal received by the antenna. According to the present embodiment, the short-range wireless communication unit 112 communicates with other apparatuses in accordance with the IEEE802.15.1 standard (so-called Bluetooth). The short-range wireless communication unit 209 can perform both Bluetooth version 4 or later (so-called BLE) and Bluetooth versions 1 to 3 (so-called Bluetooth Classic: BTC) communications in a parallel way. BLE has a slower communication speed and lower power consumption than BTC. In addition, BTC has a slower communication speed and lower power consumption than wireless LAN. These Bluetooth communications have a narrower communicable range (that is, a shorter communicable distance) than wireless LAN communication.

For the connection via BLE, the smartphone 200 plays the role of a central apparatus. That is, in response to receiving an advertise periodically sent by a peripheral apparatus, the smartphone 200 sends a connection request to the peripheral apparatus to establish the connection.

A public network connection unit 211 is an interface used when public wireless communication is performed. The smartphone 200 can make a voice call to another apparatus via the public network connection unit 211. At this time, the control unit 201 achieves the voice call by inputting and outputting an audio signal via a microphone 212 and a loudspeaker 213, respectively. According to the present embodiment, the public network connection unit 211 is an antenna, and the control unit 201 can connect to the public network via the antenna. Note that the communication unit 208 and the public network connection unit 211 can be a single antenna.

By using the smartphone 200, the user can remotely control the digital camera 100 through an APP running on the smartphone 200. Control UIs for functions to remotely control the digital camera 100 (hereinafter referred to as a function buttons) are arranged in the menu screen of the APP. By operating the function button and determining a function to be used by the user, the user can view, through the smartphone 200, images recorded on the recording medium 110 of the digital camera 100 or remotely capture an image with the digital camera 100. Note that remote control of image capture and viewing of the images in the camera can be performed between the digital camera 100 according to the present embodiment and the smartphone 200 via a wireless LAN. Furthermore, a reduced image can be transmitted from the camera to the smartphone via BTC. Note that the BTC has a slower communication speed than the wireless LAN. Therefore, to complete transmission of an image within a realistic time frame, the reduced image is sent instead of the original-sized image. BLE is used by one party to notify the other of the use of the wireless LAN or BTC. BLE is not used to receive image data or the like.

<Network System Configuration>

Figure 3A:
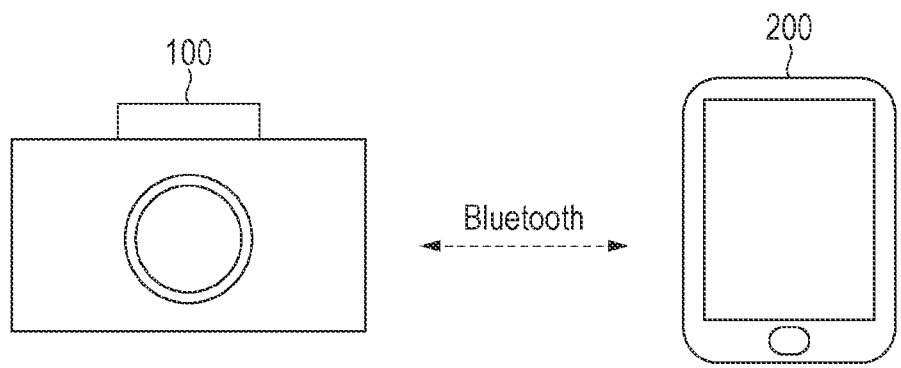
FIG. 3A is a diagram illustrating an example of the network configuration of a digital camera and a smartphone according to the first embodiment.

FIG. 3A is a schematic illustration of an example of the network system according to the present embodiment. According to the present embodiment, a description is given with reference to an example of a system in which a digital camera 100 and a smartphone 200 communicate with each other over Bluetooth.

As illustrated in FIG. 3A, the network system includes a digital camera 100 and a smartphone 200, which can communicate with each other by short-range wireless communication via BLE.

Figure 3B:
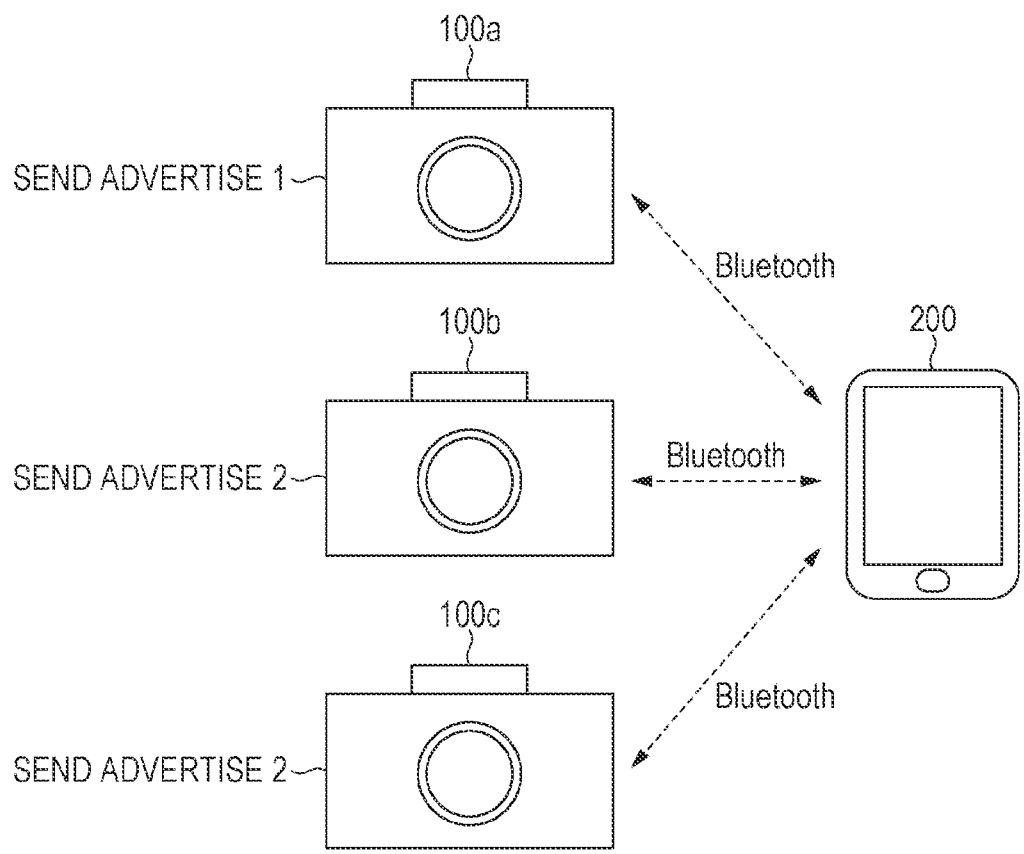
FIG. 3B illustrates an example of the network configuration of a plurality of digital cameras and a smartphone according to the first embodiment.

FIG. 3B illustrates the smartphone 200 receiving BLE advertise packets of a plurality of digital cameras 100a, 100b and 100c and checking the respective pairing information in the advertise signals. The smartphone 200 is capable of connection and pairing with a plurality of digital cameras 100 and is capable of sending and receiving encrypted and unencrypted data via both BLE and BTC.

Each of the cameras according to the present embodiment sends one of different advertise packets in accordance with the function of the Bluetooth communication installed in the camera. The information in the advertise packets is described below with reference to FIG. 4.

Figure 4:
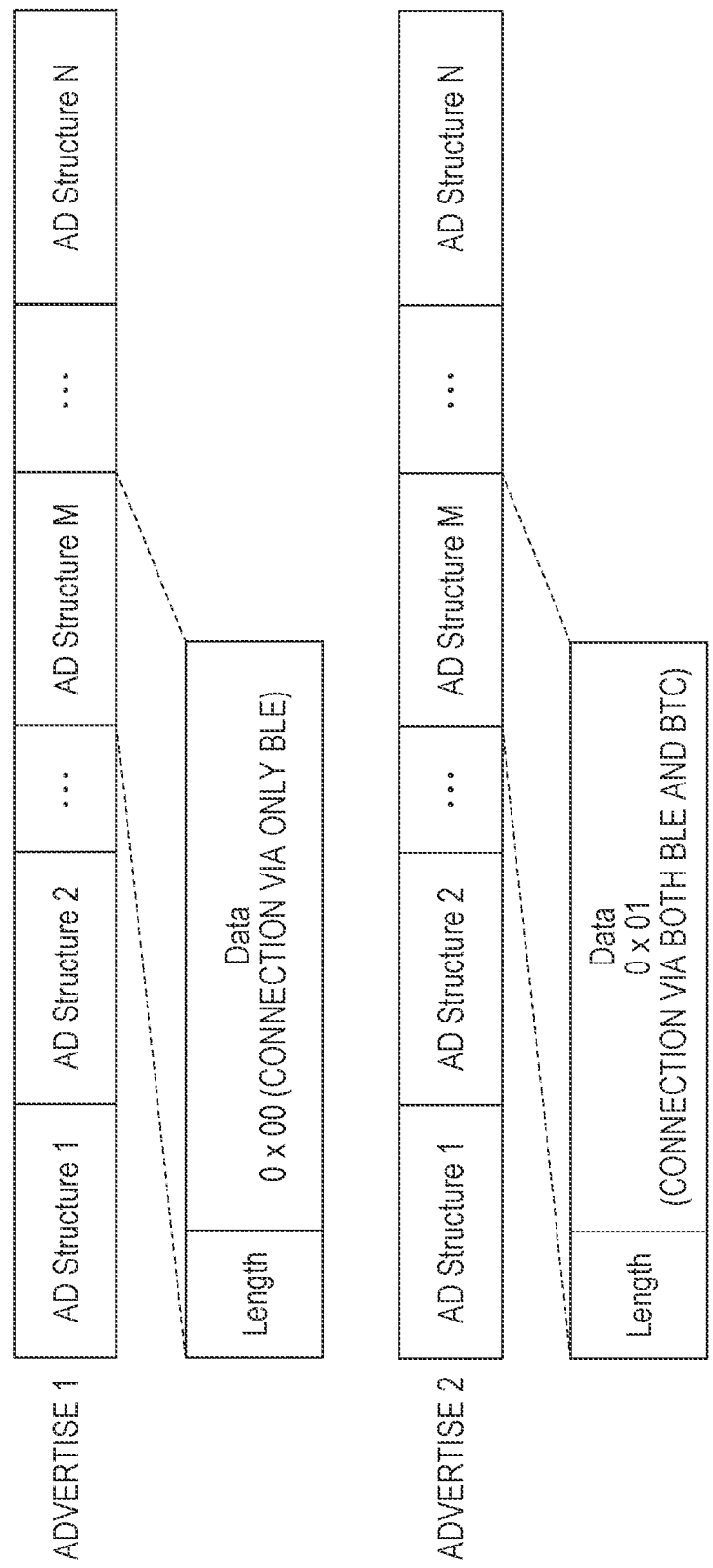
FIG. 4 is a diagram illustrating an example of an advertise packet of a digital camera according to the first embodiment.

FIG. 4 illustrates examples of a BLE advertise packet for the digital camera 100 according to the present embodiment.

An advertise signal packet sent from the digital camera 100 that supports only BLE is described first. The digital camera 100 that supports only BLE sends out an advertise signal denoted by "advertise 1" in FIG. 4. Advertise 1 includes a value of 0x00 as part of the advertise signal, which indicates that the digital camera 100 supports only BLE.

If the smartphone 200 receives advertise 1 and determines that advertise 1 contains a value of 0x00, the smartphone 200 establishes a Bluetooth connection with the digital camera 100 by using a procedure in which the smartphone 200 is connected via encrypted BLE communication and does not establish BTC communication. In the following description, the procedure in which only encrypted BLE pairing is performed is referred to as "connection procedure 1".

A packet of an advertise signal sent from the digital camera 100 that supports both BLE and BTC is described below. The digital camera 100 that supports both BLE and BTC sends an advertise signal denoted by advertise 2 in FIG. 4. Advertise 2 includes a value of 0x01 as part of the advertise signal, which indicates that the digital camera 100 supports both BLE and BTC.

If the smartphone 200 receives advertise 2 and determines that advertise 2 contains a value of 0x01, the smartphone 200 establishes a Bluetooth connection with the digital camera 100 by using a procedure in which the smartphone 200 is connected via unencrypted BLE communication and, thereafter, establishes the encrypted BTC communication. In the following description, the procedure in which unencrypted BLE pairing is performed and, thereafter, encrypted BTC pairing is preformed is referred to as "connection procedure 2".

Note that according to the present embodiment, the information included in the packet is not limited to numerical information. For example, the information may be character information, such as "BLE Only" or "BLE & BTC". If the Bluetooth communication means support information is not added to the advertise packet, it may be determined that only BLE communication means is supported. However, if a value indicating communication means is added, it may be determined that BTC is supported in addition to BLE. Alternatively, the advertise packet may include model information indicating the model of the digital camera 100, and the smartphone 200 may have cross-reference information between a model and a Bluetooth communication function. Thus, the smartphone 200 may get to know the Bluetooth communication function of the digital camera 100.

In addition, according to the present embodiment, each of advertise packets includes a character string indicating the device name which is the name of the digital camera 100. The device name is displayed on the display unit 206 of the smartphone 200 that receives an advertise packet. In this way, the user can identify the digital camera that can be controlled remotely from the smartphone 200.

In the BLE communication in which connection is established in this way, the smartphone 200 can send a request to activate the wireless LAN of the digital camera 100. In this respect, by sharing the communication parameters (a network identifier (SSID) and a password) to be used for connection of the wireless LAN via the BLE or BTC in advance, a troublesome operation required for the user to input the communication parameters can be eliminated. With respect to the communication parameter sharing, the smartphone 200 according to the present embodiment selects one of different sharing procedures in accordance with whether the digital camera 100 supports only BLE or both BLE and BTC. The following description is given focusing on the difference between the sharing procedures.

<Sequence for Establishing Bluetooth Communication Using Connection Procedure 1>

Figure 5:
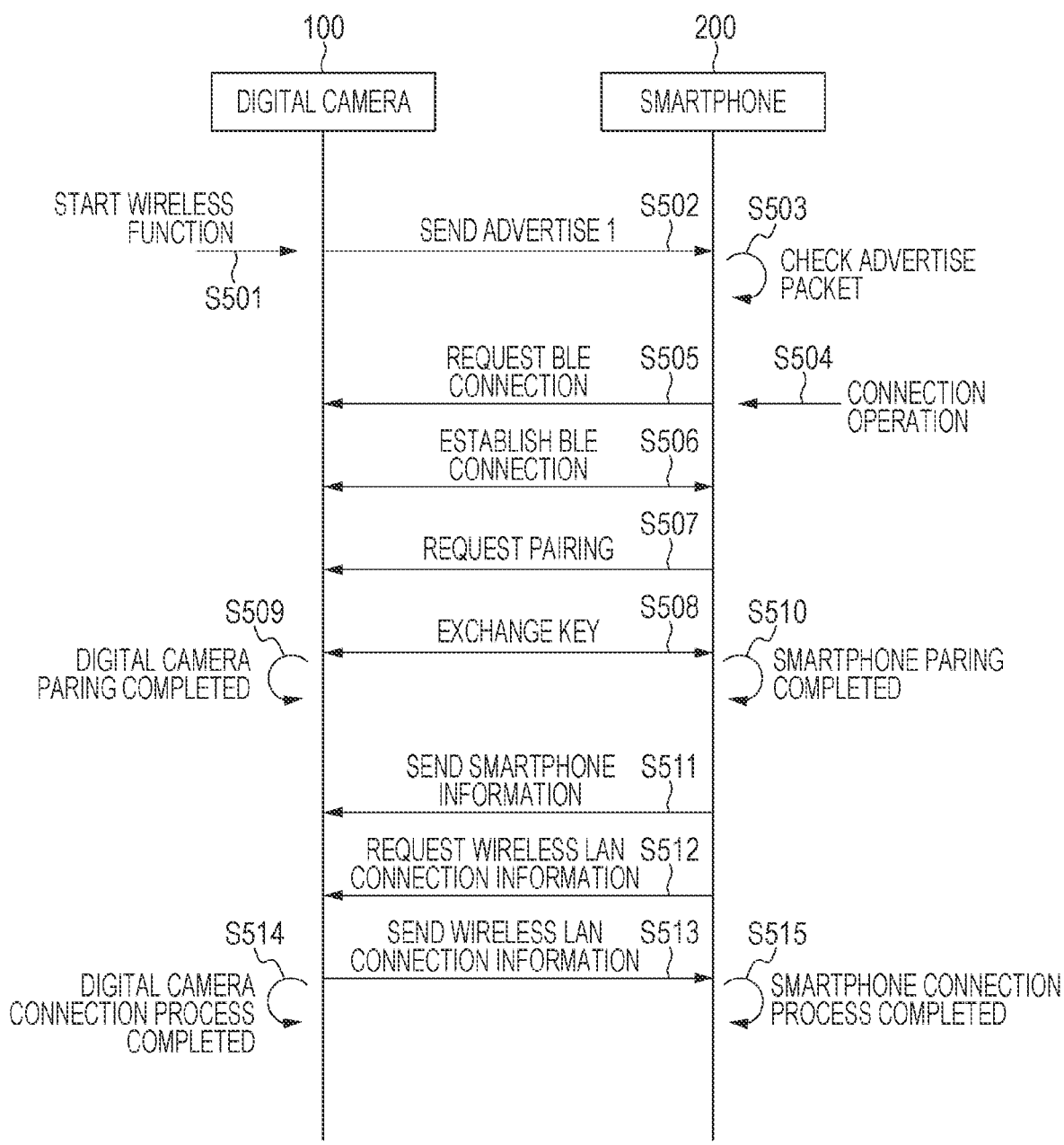
FIG. 5 is a diagram illustrating the sequence in which a digital camera and a smartphone are connected in accordance with connection procedure 1 according to the first embodiment.

The sequence of connection procedure 1 is described below with reference to FIG. 5, in which only encrypted BLE pairing is performed between the digital camera 100 and the smartphone 200.

When the digital camera 100 enters a Bluetooth connection enabled state with the wireless function enabled (step S501), the digital camera 100 sends an advertise packet (step S502). The advertise packet at this time is an advertise signal of advertise 1 illustrated in FIG. 4.

Note that the Bluetooth connection enabled state refers to, for example, a state that occurs when the user operates the operation unit 105 to operate the release switch or the playback button to wake the digital camera 100 from a sleep state.

The smartphone 200 receives advertise 1 and refers to the information in advertise 1 to determine whether a Bluetooth connection is enabled (step S503). If a Bluetooth connection is enabled, the smartphone 200 receives, from the user, a connection operation regarding the connection with the digital camera 100 (step S504). Upon receiving a connection operation, the smartphone 200 sends, to the digital camera 100, a BLE connection request to establish an encrypted BLE connection (step S505). The digital camera 100 receives the BLE connection request from the smartphone 200 and connects to the smartphone 200 via BLE. The smartphone 200 confirms the BLE connection with the digital camera 100 and establishes the connection (step S506). Note that while the BLE connection is being established, the digital camera stops sending out an advertise signal.

If the smartphone 200 determines that pairing is not performed with the digital camera 100, the smartphone 200 sends a pairing request to the digital camera 100 (step S507). The digital camera 100 that has received the paring request and the smartphone 200 exchange key data with each other (step S508). The digital camera 100 stores the received key data in the nonvolatile memory 103 and completes the pairing (step S509), and the smartphone 200 stores the received key data in the nonvolatile memory 203 and completes the pairing (step S510).

Once pairing is completed between the digital camera 100 and the smartphone 200, an encrypted BLE communication is thereafter available between the digital camera 100 and the smartphone 200.

The smartphone 200 sends the information regarding the smartphone 200 to the digital camera 100 (step S511).

Subsequently, the smartphone 200 requests the wireless LAN connection information from the digital camera 100 (step S512). The digital camera 100 encrypts the connection information (including the SSID and password) regarding the wireless LAN connection of the digital camera 100 and sends the connection information to the smartphone 200 via the encrypted BLE communication (step S513). Subsequently, after the necessary data exchange is completed, the digital camera 100 completes the BLE connection process with the smartphone 200 (step S514). In addition, the smartphone 200 completes the BLE connection process with the digital camera 100 (step S515).

<Sequence for Establishing Bluetooth Communication Using Connection Procedure 2>

Figure 6:
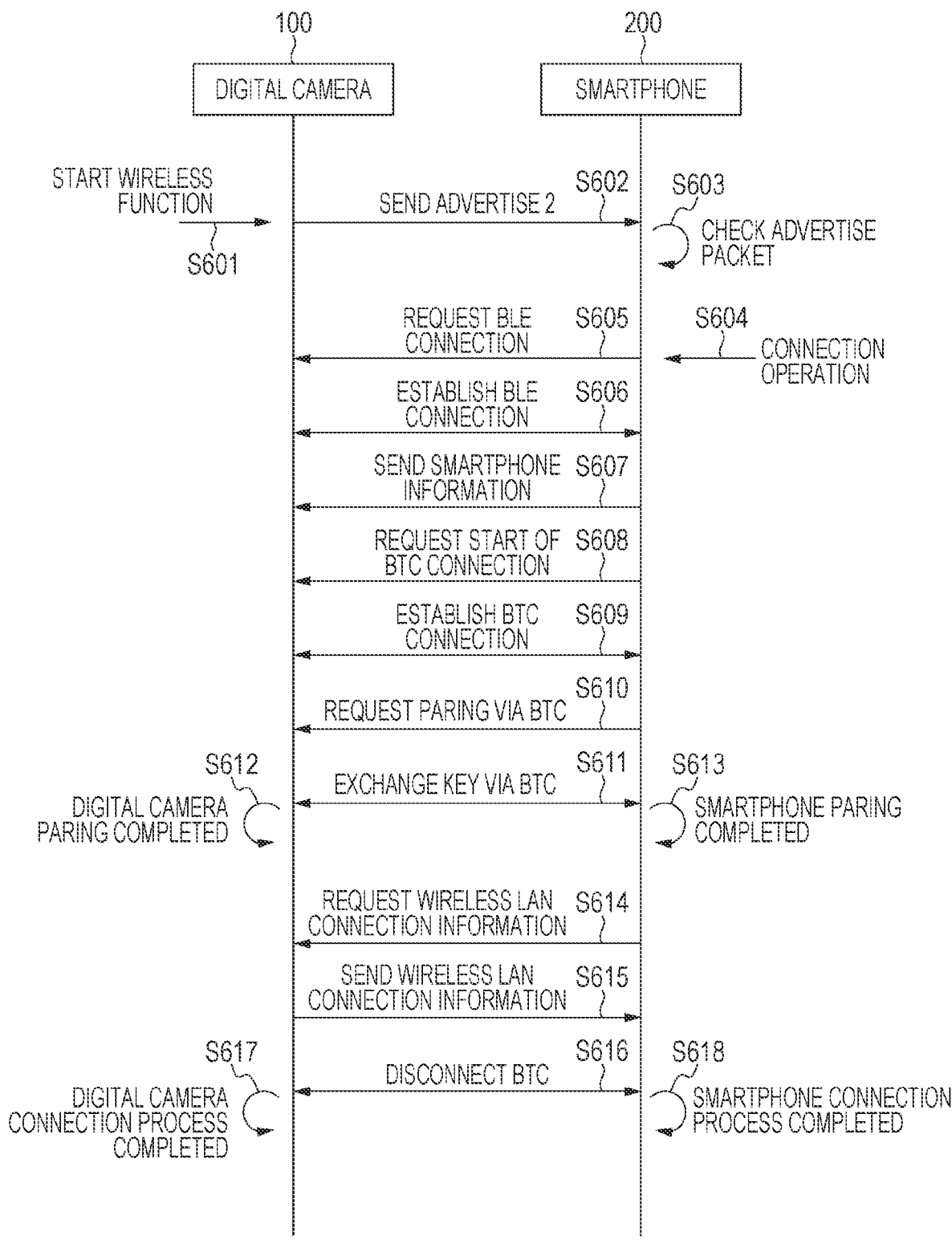
FIG. 6 is a diagram illustrating the sequence in which a digital camera and a smartphone are connected in accordance with connection procedure 2 according to the first embodiment.

The sequence of connection procedure 2 is described below with reference to FIG. 6, in which BLE pairing is performed in unencrypted communication between the digital camera 100 and the smartphone 200 and, furthermore, BTC pairing is performed in encrypted communication.

When the digital camera 100 enters a Bluetooth connection enabled state with the wireless function enabled (step S601), the digital camera 100 sends an advertise packet (step S602). The advertise packet at this time is an advertise signal of advertise 2 illustrated in FIG. 4.

The smartphone 200 receives advertise 2 and refers to the information in advertise 2 to determine whether a Bluetooth connection is enabled (step S603). If a Bluetooth connection is enabled, the smartphone 200 receives, from the user, a connection operation regarding the connection with the digital camera 100 (step S604). The smartphone 200 that has received a connection operation sends, to the digital camera 100, a BLE connection request to establish an unencrypted BLE connection (step S605). The digital camera 100 receives the Bluetooth connection request from the smartphone 200 and connects to the smartphone 200 via Bluetooth Low Energy. The smartphone 200 confirms the Bluetooth Low Energy connection with the digital camera 100 and establishes the connection (step S606).

The smartphone 200 sends the information regarding the smartphone 200 to the digital camera 100 (step S607).

Subsequently, the smartphone 200 sends, to the digital camera 100, a connection request over encrypted Bluetooth Classic (step S608). The digital camera 100 receives the BTC connection request from the smartphone 200 and establishes the connection over Bluetooth Classic. The smartphone 200 confirms the connection with the digital camera 100 over Bluetooth Classic and establishes the connection (step S609).

Subsequently, if the smartphone 200 determines that pairing is not performed with the digital camera 100, the smartphone 200 sends a pairing request to the digital camera 100 in accordance with the BTC protocol specification (step S610).

The digital camera 100 that has received the pairing request and the smartphone 200 exchange key data with each other (step S611). The digital camera 100 stores the received key data in the nonvolatile memory 103 and completes the pairing (step S612). The smartphone 200 stores the received key data in the nonvolatile memory 203 and completes the pairing (step S613).

Once pairing is completed between the digital camera 100 and the smartphone 200, an encrypted BTC communication is thereafter available between the digital camera 100 and the smartphone 200. Note that the unencrypted BLE communication is maintained while the encrypted BTC communication is being performed.

Subsequently, the smartphone 200 requests the wireless LAN connection information from the digital camera 100 (step S614). The digital camera 100 encrypts the connection information regarding the wireless LAN connection of the digital camera 100 and sends the connection information to the smartphone 200 via encrypted BTC communication (step S615). Subsequently, after the necessary data exchange is completed, the smartphone 200 disconnects the Bluetooth Classic communication (step S616).

The digital camera 100 completes the connection process with the smartphone 200 (step S617). In addition, the smartphone 200 completes the connection process with the digital camera 100 (step S618).

<Flowchart of Communication Performed by Digital Camera Using Connection Procedure 1>

Figure 7:
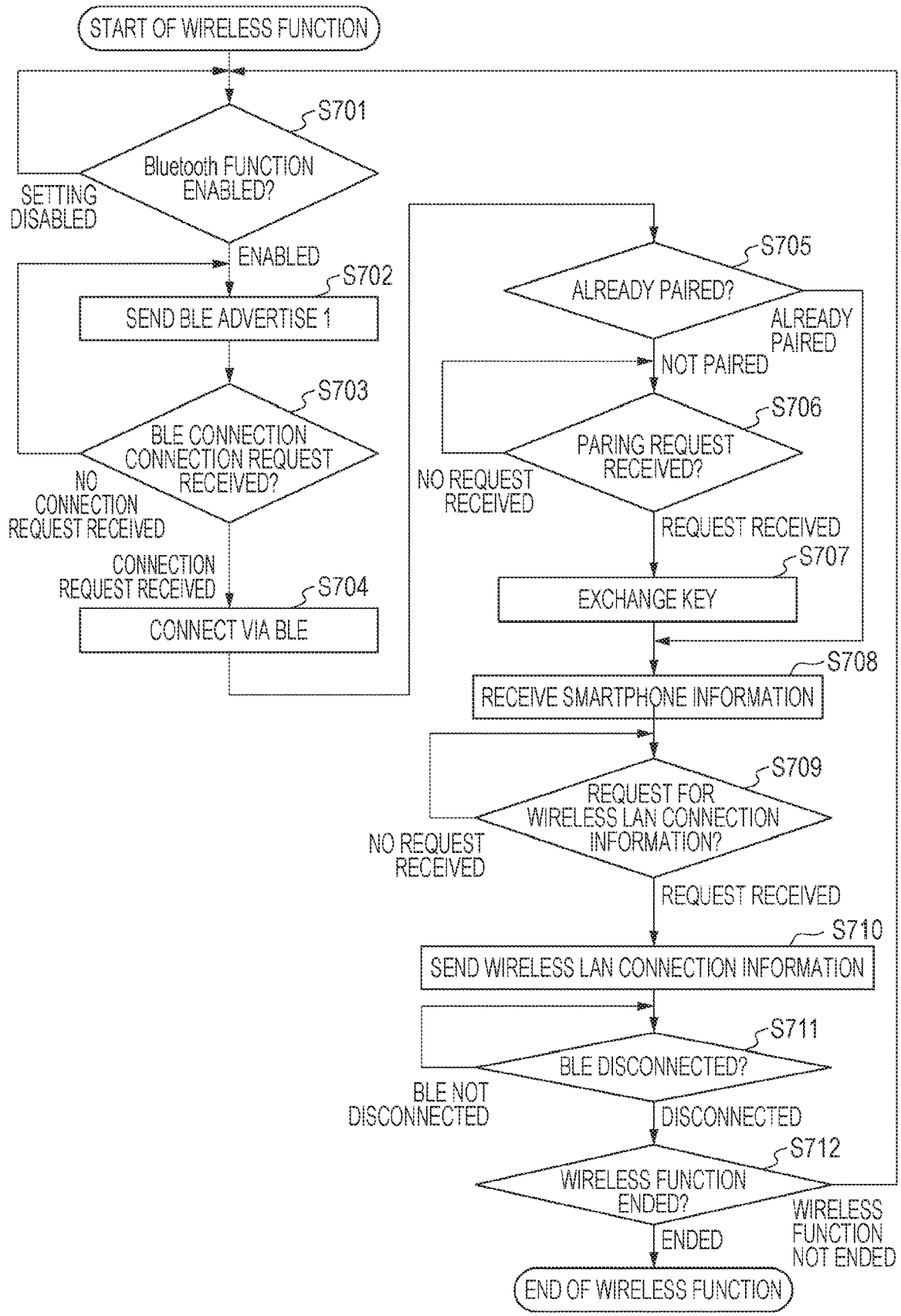
FIG. 7 is a flowchart illustrating the operation of the digital camera when it connects to a smartphone in accordance with connection procedure 1 according to the first embodiment.

The operation performed by the digital camera 100 communicating using connection procedure 1 is described below with reference to FIG. 7. The flowchart in FIG. 7 starts when the wireless function of the digital camera 100 is enabled.

The control unit 101 determines whether the Bluetooth function is enabled (step S701). If the Bluetooth function is enabled, the control unit 101 sends, to the surroundings, the advertise-1 signal via BLE illustrated in FIG. 4 (step S702). The control unit 101 determines whether it has received a BLE connection request to establish an encrypted BLE connection from the smartphone 200, which is the connection partner (step S703). If a connection request has been received, the processing proceeds to step S704. Otherwise, the processing returns to step S702.

The control unit 101 establishes a connection with the smartphone 200 via Bluetooth Low Energy (step S704) and determines whether the digital camera 100 is already paired with the smartphone 200 (step S705). If the digital camera 100 is already paired with the smartphone 200, the processing performed by the control unit 101 proceeds to step S708. If the digital camera 100 is not paired with the smartphone 200, the control unit 101 determines whether a pairing request has been received from the smartphone 200 (step S706). If a pairing request has not been received from the smartphone 200, the control unit 101 performs step S706 again. If a pairing request has been received, the control unit 101 exchanges the key with the smartphone 200 to enable encrypted communication (step S707).

Subsequently, the control unit 101 receives the smartphone information from the smartphone 200 (step S708). Thereafter, the control unit 101 determines whether it has received, from the smartphone 200, a request to send the confidential wireless LAN connection information of the digital camera 100 (the information including the password and the like) (step S709). If the request has been received, the control unit 101 sends the wireless LAN connection information to the smartphone 200 (step S710). If the request has not been received, step S709 is repeated. By performing Bluetooth Low Energy communication between the digital camera 100 and the smartphone 200, the control unit 101 determines whether the communication has not been disconnected (step S711). If the Bluetooth Low Energy communication is disconnected, the processing performed by the control unit 101 proceeds to step S712. The control unit 101 determines whether the user has not operated to terminate the wireless function (step S712). If the wireless function is not terminated, the processing returns to step S701. If the wireless function is terminated, the processing ends.

<Flowchart of Communication Performed by Smartphone Using Connection Procedure 1>

The operation performed by the smartphone 200 communicating using connection procedure 1 is described below with reference to FIG. 8. The flowchart in FIG. 8 starts when the user instructs, via the main screen displayed on the display unit 206, the smartphone 200 to connect to a digital camera that sends advertise 1. Note that the reception of the advertise, the user's instructions, and the information displayed on the main screen are described later with reference to FIG. 11 and subsequent figures.

The control unit 201 sends, to the digital camera 100, a BLE connection request to establish an encrypted BLE connection (step S851) and confirms the connection acceptance from the digital camera 100 first (step S852). Once the Bluetooth connection between the smartphone 200 and the digital camera 100 is established, the processing proceeds to step S853, and the control unit 201 determines whether the smartphone 200 has already been paired with the digital camera 100 (step S853).

If a pairing has already been performed between the smartphone 200 and the digital camera 100, the processing proceeds to step S856. If the pairing has not been performed, the control unit 201 sends a pairing request to the digital camera 100 (step S854). Once pairing is initiated between the smartphone 200 and the digital camera 100, the control unit 201 sends the encryption key to the digital camera 100. Thereafter, the keys for the encrypted communication are exchanged between the smartphone 200 and the digital camera 100. Thus, the pairing is completed (step S855).

Once pairing is completed, encrypted communication via BLE is enabled, and the control unit 201 sends its own smartphone information to the digital camera 100 (step S856). Furthermore, to enable a wireless LAN connection with the digital camera 100, the control unit 201 sends, to the digital camera 100, a request to send the wireless LAN connection information including highly confidential password information that the digital camera 100 has (step S857).

The control unit 201 determines whether the wireless LAN information has been sent from the digital camera 100 (step S858). If the wireless LAN information has been sent, the processing ends.

Note that the connection button may function by selecting an item in the list of detected digital cameras 100, or the connection button may be a button indicating a specific connection.

The operation performed by the digital camera 100 and the operation performed by the smartphone 200 in connection procedure 1 have been described above.

<Flowchart of Communication Performed by Digital Camera Using Connection Procedure 2>

Figure 9A:
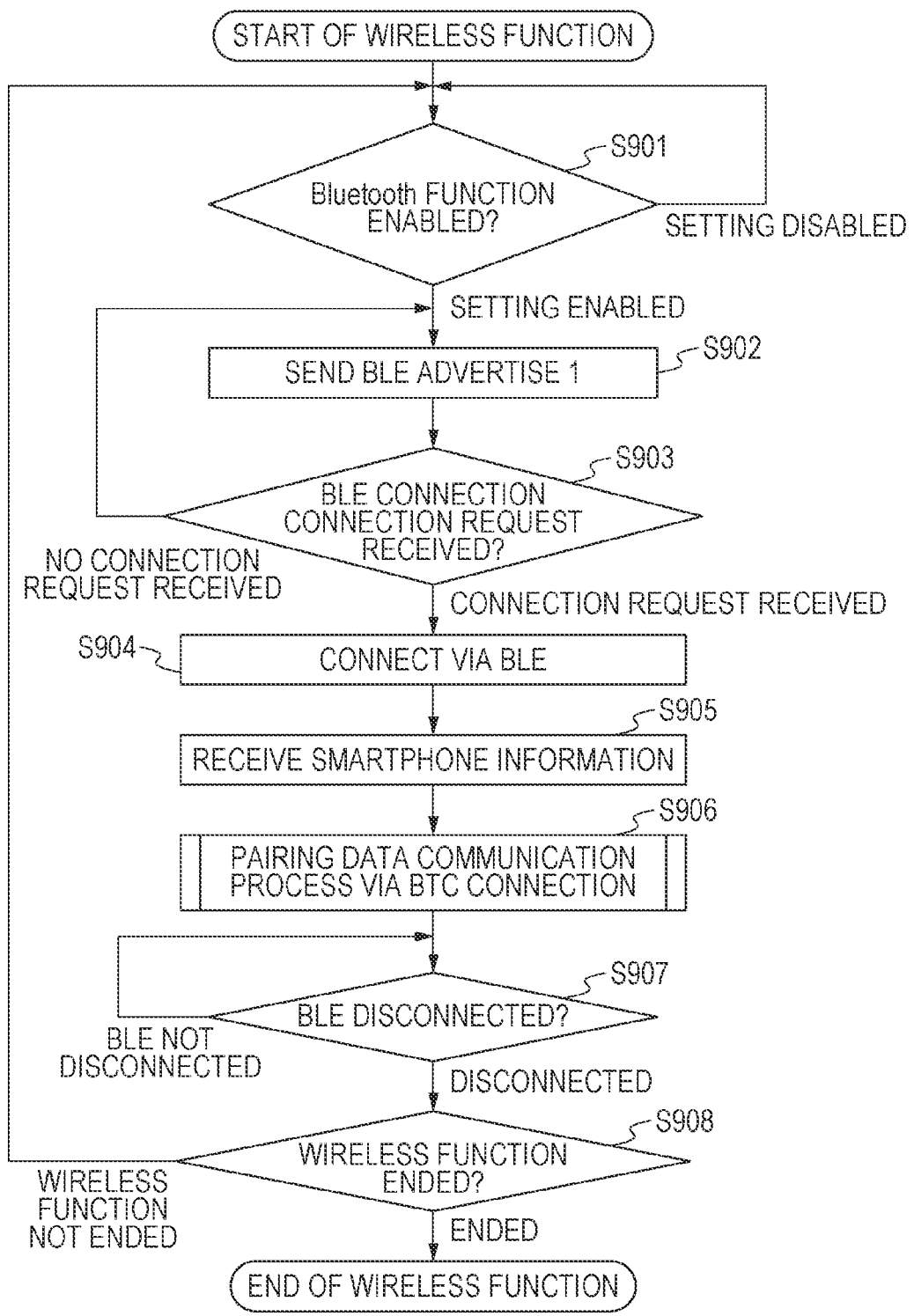
FIG. 9A is a flowchart illustrating the operation of the digital camera when it connects to a smartphone in accordance with connection procedure 2 according to the first embodiment.

The operation performed by the digital camera 100 communicating using connection procedure 2 is described below with reference to FIG. 9A. The flowchart in FIG. 9A starts when the wireless function of the digital camera 100 is enabled.

The control unit 101 determines whether the Bluetooth function is enabled (step S901). If the Bluetooth function is enabled, the control unit 101 sends, to the surroundings, the advertise-2 signal illustrated in FIG. 4 (step S902). The control unit 101 determines whether it has received a BLE connection request to establish an unencrypted BLE connection from the smartphone 200, which is the connection partner (step S903). If a connection request is received, the processing proceeds to step S904. Otherwise, the processing returns to step S902.

The control unit 101 establishes a connection with the smartphone 200 via Bluetooth Low Energy (step S904).

Figure 9B:
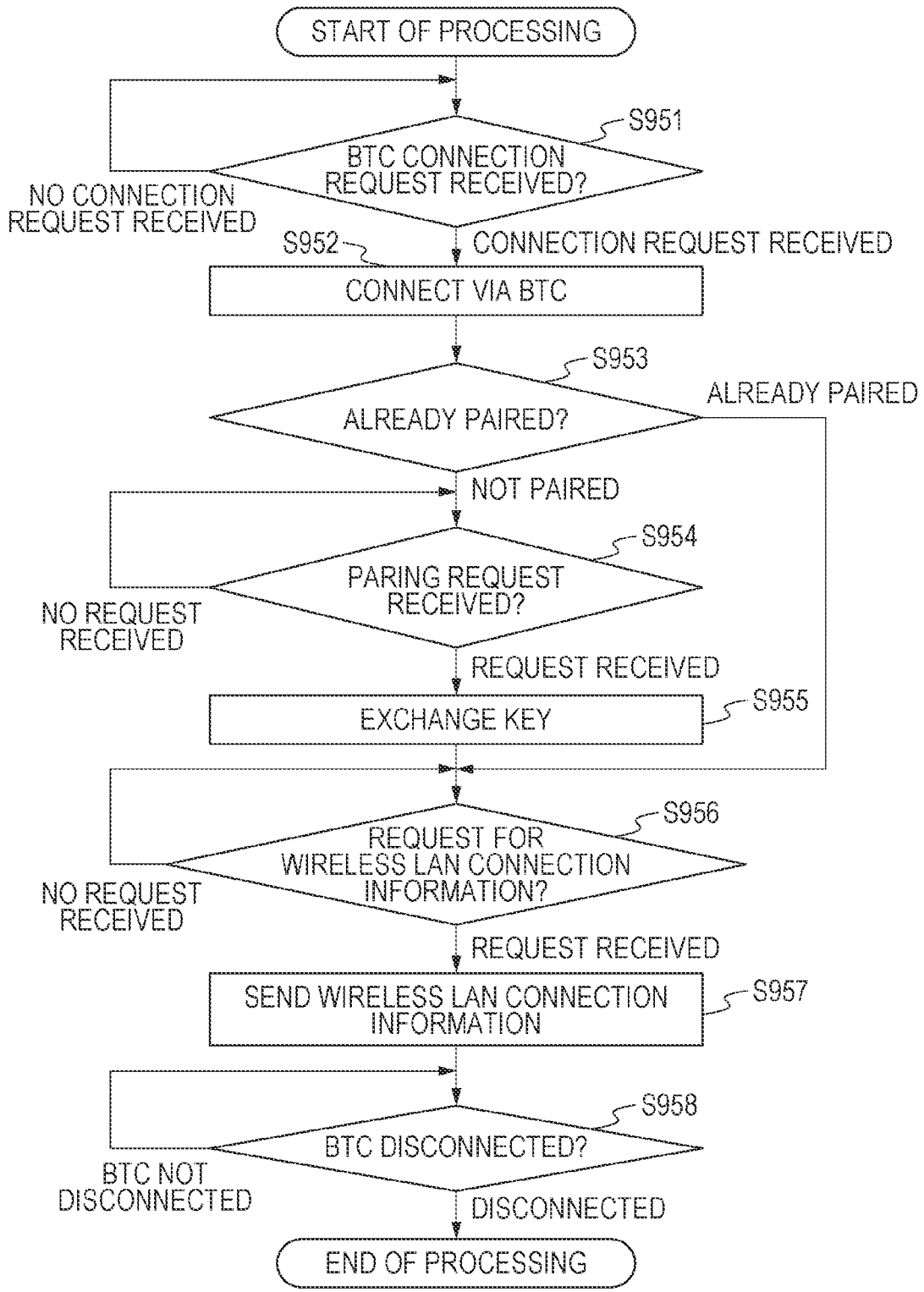
FIG. 9B is a flowchart illustrating the operation of the digital camera when it connects to a smartphone in accordance with connection procedure 2 according to the first embodiment.

Subsequently, the control unit 101 receives the smartphone information from the smartphone 200 (step S905) and performs pairing and data communication process via Bluetooth Classic in accordance with the flow illustrated in FIG. 9B (described below) (step S906).

The control unit 101 determines whether the Bluetooth Classic connection with the smartphone 200 is disconnected (step S907). If the Bluetooth Classic communication is disconnected, the control unit 101 causes the processing proceed to step S908. The control unit 101 determines whether the user has not operated to terminate the wireless function (step S908). If the wireless function is not terminated, the processing performed by the control unit 101 returns to step S901. If the wireless function is terminated, the flow ends.

The operation performed by the digital camera 100 communicating via Bluetooth Classic is described below with reference to FIG. 9B. The flowchart in FIG. 9B represents the process performed in S906 in FIG. 9A.

The control unit 101 determines whether it has received, from the smartphone 200, an encrypted Bluetooth Classic connection request (step S951). If the connection request is received, the processing proceeds to step S952. If the connection request is not received, the processing returns to step S951.

The control unit 101 establishes a Bluetooth Classic connection with the smartphone 200 (step S952) and determines whether the digital camera 100 is already paired with the smartphone 200 (step S953). If the digital camera 100 is paired with the smartphone 200, the processing proceeds to step S954. If the digital camera 100 is not paired with the smartphone 200, the control unit 101 determines whether the smartphone 200 has sent a pairing request (step S954).

If the smartphone 200 has not sent a pairing request, the control unit 101 performs step S954 again. If the smartphone 200 has sent a pairing request, the control unit 101 exchanges the key with the smartphone 200 to enable encrypted communication (step S955).

The control unit 101 determines whether it has received, from the smartphone 200, a request to send the wireless LAN connection information of the digital camera 100 ((the information including the password and the like) (step S956). If the request has been received, the control unit 101 sends the wireless LAN connection information to the smartphone 200 (step S957), and the processing proceeds to step S958. If the request has not been received, step S956 is repeated. Bluetooth Classic communication is performed between the control unit 101 and the smartphone 200, and the control unit 101 determines whether the communication is disconnected (step S958). If the Bluetooth Classic communication is disconnected, the control unit 101 terminates the flow.

<Flowchart of Communication Performed by Smartphone Using Connection Procedure 2>

The operation performed by the smartphone 200 communicating using connection procedure 2 is described below with reference to FIGS. 10A to 10B. The flowchart in FIGS. 10A to 10B starts when the user instructs, via the main screen displayed on the display unit 206, the smartphone 200 to connect to a digital camera that sends advertise 1. Note that the reception of the advertise, the user's instructions, and the information displayed in the main screen are described later with reference to FIG. 11 and subsequent figures.

Figure 10A:
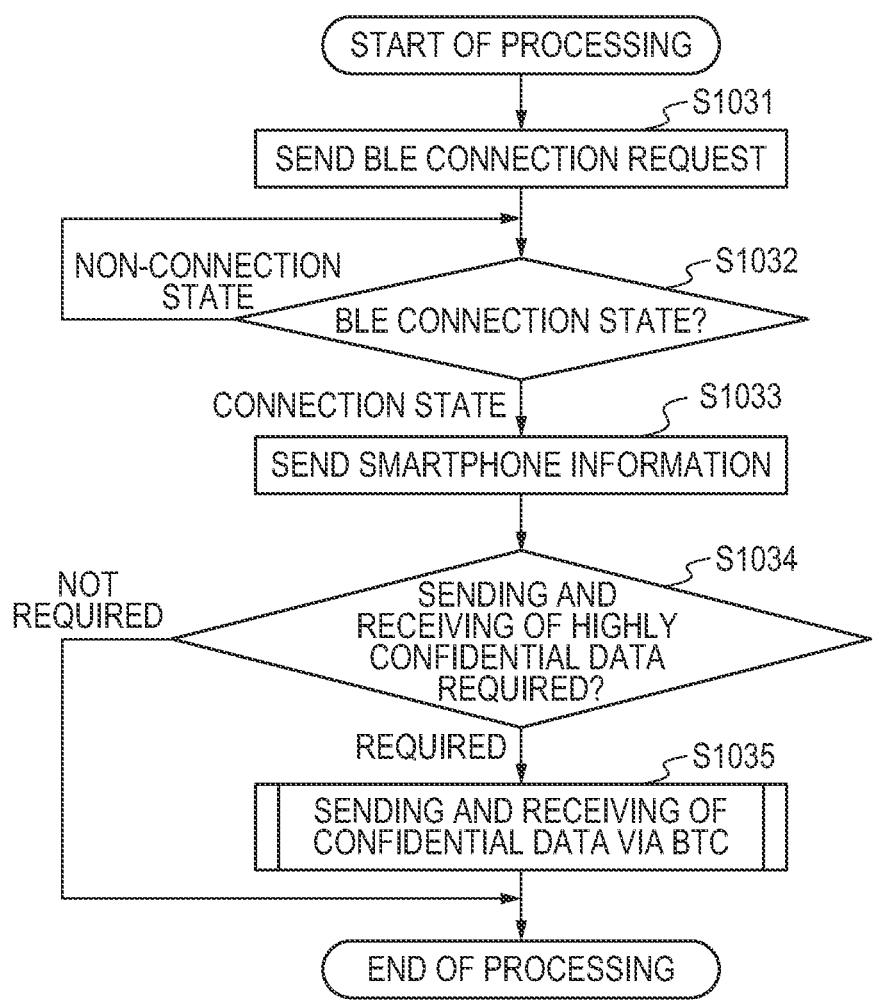
FIG. 10A is a flowchart illustrating the operation of the smartphone when it connects to a camera in accordance with connection procedure 2 according to the first embodiment

First, in step S1031 illustrated in FIG. 10A, the control unit 201 sends, the digital camera 100, a BLE connection request to establish an unencrypted BLE communication connection.

Subsequently, the control unit 201 confirms the connection acceptance from the digital camera 100 (step S1032).

When the connection between the control unit 201 and the digital camera 100 via Bluetooth Low Energy is established, the processing proceeds to step S1033, and the control unit 201 sends its own smartphone information to the digital camera 100 (step S1033).

Subsequently, the control unit 201 determines whether sending and receiving of highly confidential data to and from the digital camera 100 are required (step S1034).

If the control unit 201 determines that sending and receiving of highly confidential data are required, the control unit 201 performs sending and receiving flow control of confidential data via Bluetooth Classic illustrated in FIG. 10B (described below) (step S1035). If sending and receiving of highly confidential data are not required, the processing ends.

The operations performed by the smartphone 200 and the digital camera 100 communicating with each other via Bluetooth Classic are described below with reference to FIG. 10B. The flowchart in FIG. 10B describes the process performed in S1035 illustrated in FIG. 10A.

The control unit 201 sends an encrypted Bluetooth Classic connection request to the digital camera 100 (step S1051) and confirms the connection acceptance from the digital camera 100 (step S1052). When the Bluetooth Classic connection between the smartphone 200 and the digital camera 100 is established, the processing proceeds to step S1053, where the control unit 201 confirms whether the smartphone 200 has already been paired with the digital camera 100 (step S1053).

If the smartphone 200 and the digital camera 100 have already been paired with each other, the processing proceeds to step S1056. If no pairing has been made, the control unit 201 sends a pairing request to the digital camera 100 (step S1054). Once pairing is initiated between the smartphone 200 and the digital camera 100, the control unit 201 sends the encryption key to the digital camera 100. The keys for encrypted communication are then exchanged between the smartphone 200 and the digital camera 100. Thus, the pairing is completed (S1055).

Once the pairing is completed, encrypted communication is enabled.

Subsequently, the control unit 201 sends, to the digital camera 100, a request for communication parameters for the wireless LAN connection with the digital camera 100 (step S1056).

The control unit 201 determines whether the wireless LAN information is sent from the digital camera 100 (step S1057). If the wireless LAN information is sent, the control unit 201 determines that exchange of confidential data has been completed and requests the digital camera 100 to disconnect the Bluetooth Classic communication (step S1058). The control unit 201 confirms that the Bluetooth Classic connection with the digital camera 100 is disconnected (step S1059) and completes the processing.

Note that while the present embodiment has been described with reference to the process of sending a disconnection request to the digital camera 100 (step S1058), the disconnection process may be performed unilaterally by the smartphone 200.

<Flowchart of Determination of One of Connection Procedure 1 and Connection Procedure 2 Made by Smartphone>

Figure 11:
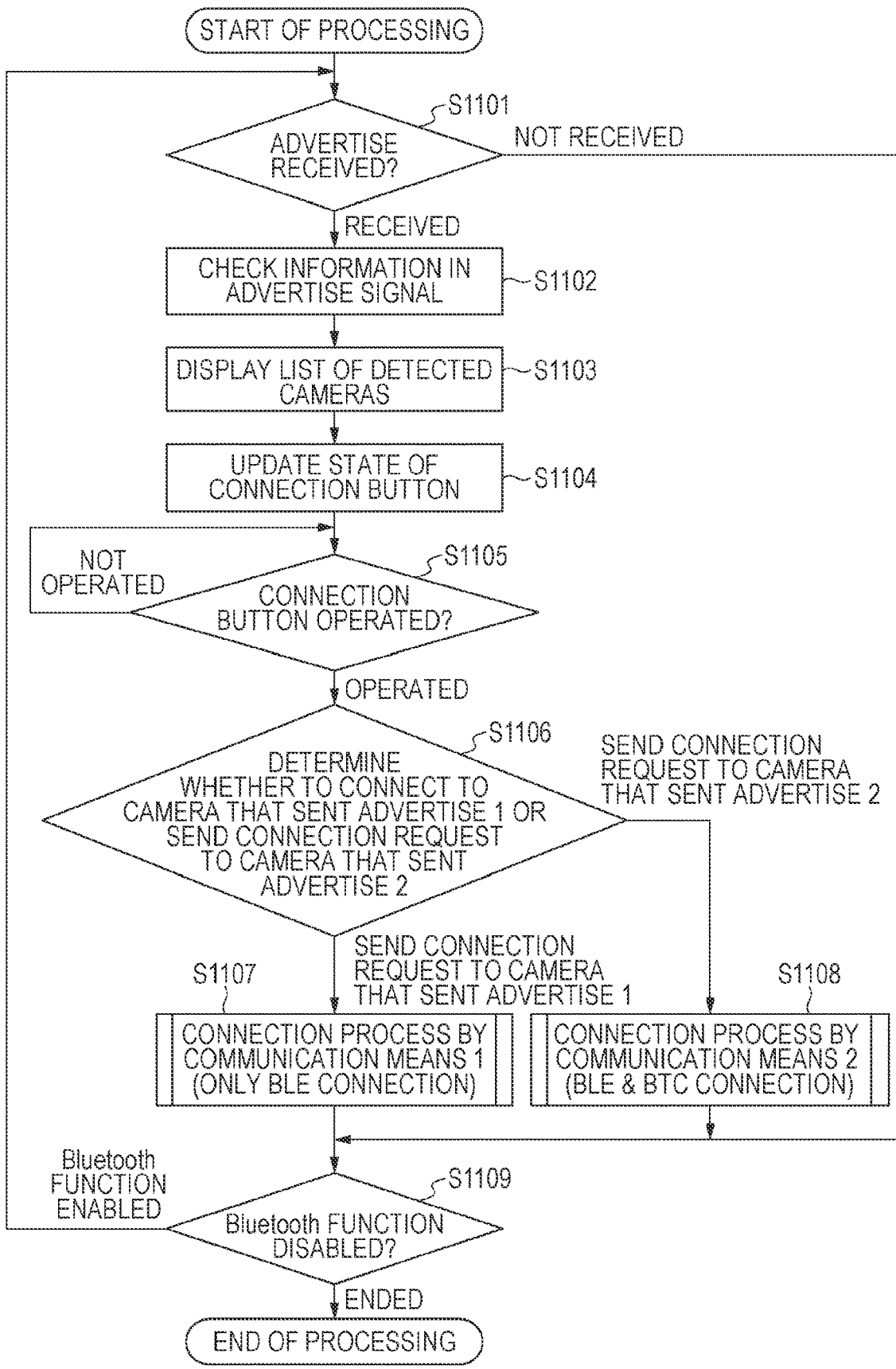
FIG. 11 is a flowchart illustrating the operation of the smartphone when it determines which one of connection procedure 1 and connection procedure 2 is to be used for connection, according to the first embodiment.

The operation described below with reference to FIG. 11 is performed by the smartphone 200 to determine which one of connection procedure 1 or connection procedure 2 is used to connect with the digital camera 100 on the basis of an advertise signal sent from the digital camera 100. The process illustrated in FIG. 11 starts with an application used to connect to a camera running on the smartphone 200.

The control unit 201 determines whether an advertise signal originating from the digital camera 100 has been received (step S1101). If the advertise signal has been received, the processing proceeds to step S1102. If the advertise signal has not been received, the processing proceeds to step S1109.

The control unit 201 checks the information in the advertise signal having a format illustrated in FIG. 4 and determines which one of the advertise-1 signal illustrated in FIG. 4 and the advertise-2 signal illustrated in FIG. 4 it has received (step S1102).

Furthermore, the control unit 201 displays the list of detected cameras on the display unit 206 (step S1103), and the state of the connection button is updated and displayed in the enabled state (step S1104).

The control unit 201 determines whether the user has operated the connection button (step S1105). If the user has operated the connection button, the processing proceeds to step S1106. In step S1106, the control unit 201 determines which one of connection procedure 1 and connection procedure 2 is to be used for connection on the basis of the result of checking the advertise signal sent from the digital camera 100 in step S1102. To connect to a camera that sent advertise 1, the connection process based on connection procedure 1 illustrated in FIG. 8 is performed (step S1107). To connect to a camera that sent advertise 2, the connection process based on connection procedure 2 illustrated in FIGS. 10A to 10B is performed (step S1108).

Subsequently, the Bluetooth communication control is performed by means of communication with the digital camera 100, which is the connection partner. Thereafter, the connection is disconnected. In step S1109, the control unit 201 determines whether the Bluetooth function of the smartphone 200 is disabled. If the Bluetooth function is disabled, the processing ends. If the Bluetooth function is enabled, the processing returns to step S1101.

<Example of Camera List Displayed on Smartphone>

Figure 12A:
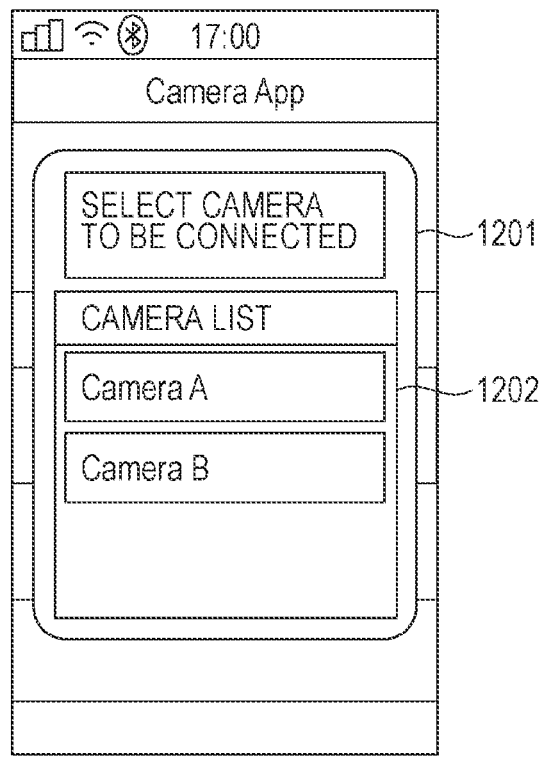
FIG. 12A is a diagram illustrating an example of a list of cameras displayed on a smartphone according to the first embodiment.

FIG. 12A is a diagram illustrating an example of a list of digital cameras displayed on the display unit 206 by the control unit 201 in step S1103 illustrated in FIG. 11. A selection dialog 1201 is displayed when the control unit 201 determines that there are a plurality of digital cameras to be displayed in the device list (i.e., digital cameras that can be used for remote control). By displaying a list of digital cameras in the dialog, the user can find the available digital cameras. The device names of the digital cameras to be displayed are listed in the digital camera display area 1202. If selection of a digital camera in the digital camera display area 1202 by the operation unit 205 is detected, the control unit 201 enables the user to use the selected function.

According to the present embodiment, if there are a plurality of remote-controllable digital cameras, the control unit 201 displays a list of device names on the display unit 206. Thereafter, if the camera to be used is selected by the user, the control unit 201 makes a Bluetooth connection.

Note that according to the present embodiment, if there is only one digital camera to be displayed, the control unit 201 does not display the selection dialog 1201, and the digital camera to be remotely controlled is automatically set. However, even when there is only one digital camera to be displayed, the selection dialog may be displayed in the same manner as when there are a plurality of digital cameras to be displayed, and the user may select the displayed digital camera. Thereafter, a Bluetooth connection and the function may be started.

As the connection button, a dedicated software button for sending a connection request may be provided in an area different from the items in the list of digital cameras 100. Alternatively, the items in the list of detected digital cameras 100 may serve as the connection buttons. That is, a connection request may be sent by selecting an item in the list of detected digital cameras 100.

<Example of Pairing Window Displayed on Smartphone>

Figure 8:
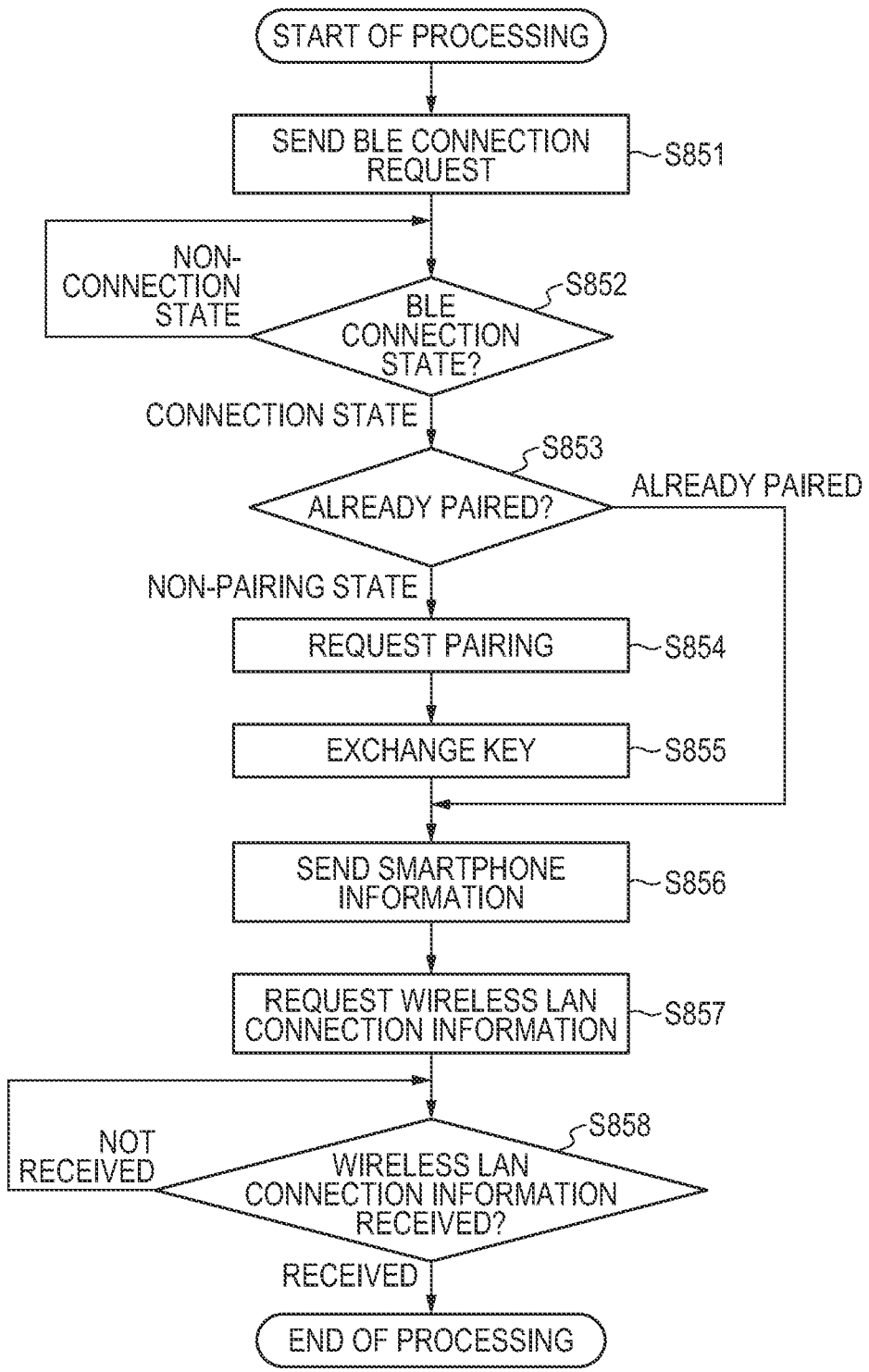
FIG. 8 is a flowchart illustrating the operation of the smartphone when it connects to a camera in accordance with connection procedure 1 according to the first embodiment.
Figure 12B:
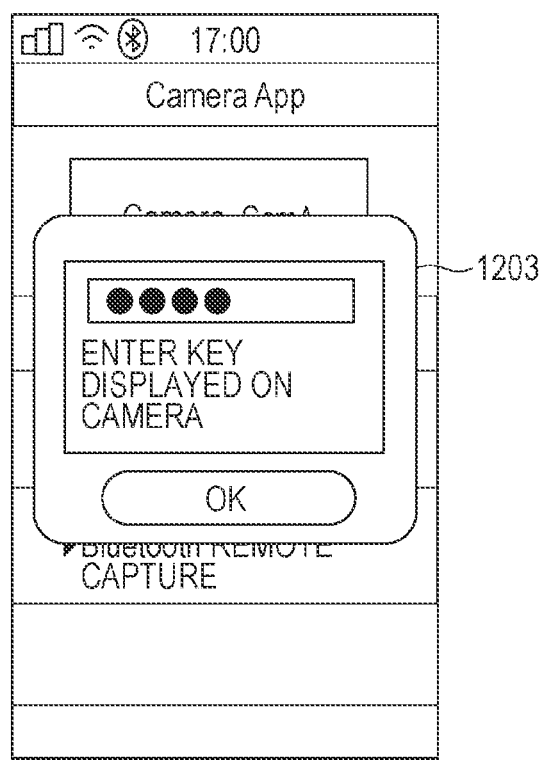
FIG. 12B is a diagram illustrating an example of inputting a link key for Bluetooth pairing to a smartphone according to the first embodiment.

FIG. 12B illustrates an example of a window displayed to input the authentication password for the encryption key used in the key exchange between the digital camera 100 and the smartphone 200 in step S854 illustrated in FIG. 8 and step S1054 illustrated in FIG. 10B.

A key input dialog 1203 is displayed on the display unit 206 by the control unit 201 of the smartphone 200 when key exchange is initiated by the digital camera 100. The user refers to the key displayed on the display unit 106 of the digital camera 100, inputs the key input dialog 1203 key, and makes the decision. Once the input is completed, key exchange is made between the digital camera 100 and the smartphone 200. Thus, the pairing is completed.

While the present embodiment has been described with reference to pairing control based on key input to a dedicated dialog, a pairing based on Just Works that does not require key input may be employed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
    a first communication unit configured to receive an advertise signal from an external apparatus;
    a second communication unit configured to wirelessly communicate with the external apparatus by using a predetermined protocol;
    a third communication unit configured to perform wireless communication with the external apparatus via a network; and
    a control unit configured to determine whether the external apparatus supports the predetermined protocol on the basis of the advertise signal from the external apparatus,
    wherein if it is determined that the external apparatus does not support the predetermined protocol, the control unit performs control so that a request to start encrypted communication is sent to the external apparatus via the first communication unit,
    wherein if it is determined that the external apparatus supports the predetermined protocol, the control unit performs control so that a request to start unencrypted communication is sent to the external apparatus via the first communication unit,
    wherein if it is determined that the external apparatus does not support the predetermined protocol, the control unit shares an identifier of the network with the external apparatus by using encrypted communication via the first communication unit, and
    wherein if it is determined that the external apparatus supports the predetermined protocol, the control unit shares the identifier of the network with the external apparatus by using encrypted communication via the second communication unit.

2. The communication apparatus according to claim 1, wherein if it is determined that the external apparatus supports the predetermined protocol, the control unit performs control so that a request to start unencrypted communication is sent to the external apparatus via the first communication unit and performs control so that a request to start encrypted communication is sent to the external apparatus via the second communication unit.

3. The communication apparatus according to claim 2, further comprising:
a recording medium,
wherein after establishing wireless communication with the external apparatus via the predetermined protocol by using the second communication unit, the control unit performs control so that information regarding the external apparatus is recorded on the recording medium and the wireless communication via the predetermined protocol is disconnected.

4. The communication apparatus according to claim 1, wherein if a connection request to establish wireless communication via the network is received from the external apparatus via the first communication unit, the network is formed by using the identifier of the network shared with the external apparatus in advance by using encrypted communication via the second communication unit.

5. The communication apparatus according to claim 1, wherein
the external apparatus includes an image sensor, and
the control unit performs control so that an operation of the image sensor is remotely controlled via the third communication unit.

6. The communication apparatus according to claim 1, wherein the control unit determines whether the external apparatus supports the predetermined protocol on the basis of predetermined character information included in the advertise signal from the external apparatus.

7. The communication apparatus according to claim 1, wherein the control unit determines whether the external apparatus supports the predetermined protocol on the basis of information that is included in the advertise signal from the external apparatus and that indicates a model of the external apparatus.

8. The communication apparatus according to claim 1, wherein the control unit determines whether the external apparatus supports the predetermined protocol on the basis of whether predetermined information is included in the advertise signal from the external apparatus.

9. A method for controlling a communication apparatus comprising a first communication unit configured to receive an advertise signal from an external apparatus, a second communication unit configured to wirelessly communicate with the external apparatus by using a predetermined protocol, and a third communication unit configured to perform wireless communication with the external apparatus via a network, the method comprising:
determining whether the external apparatus supports the predetermined protocol on the basis of the advertise signal from the external apparatus;
if it is determined that the external apparatus does not support the predetermined protocol, performing control so that a request to start encrypted communication is sent to the external apparatus via the first communication unit;
if it is determined that the external apparatus supports the predetermined protocol, performing control so that a request to start unencrypted communication is sent to the external apparatus via the first communication unit,
if it is determined that the external apparatus does not support the predetermined protocol, sharing an identifier of the network with the external apparatus by using encrypted communication via the first communication unit; and
if it is determined that the external apparatus supports the predetermined protocol, sharing the identifier of the network with the external apparatus by using encrypted communication via the second communication unit.

10. The method for controlling the communication apparatus according to claim 9, wherein if it is determined that the external apparatus supports the predetermined protocol, control is performed so that a request to start unencrypted communication is sent to the external apparatus via the first communication unit and control is performed so that a request to start encrypted communication is sent to the external apparatus via the second communication unit.

11. The method for controlling the communication apparatus according to claim 10, further comprising, after establishing wireless communication with the external apparatus via the predetermined protocol by using the second communication unit, performing control so that information regarding the external apparatus is recorded on a recording medium and the wireless communication via the predetermined protocol is disconnected.

12. The method for controlling the communication apparatus according to claim 9, further comprising, if a connection request to establish wireless communication via the network is received from the external apparatus via the first communication unit, forming the network by using the identifier of the network shared with the external apparatus in advance by using encrypted communication via the second communication unit.

13. The method for controlling the communication apparatus according to claim 9, wherein
the external apparatus includes an image sensor, and
the method further comprises performing control so that an operation of the image sensor is remotely controlled via the third communication unit.

14. The method for controlling the communication apparatus according to claim 9, wherein whether the external apparatus supports the predetermined protocol is determined on the basis of predetermined character information included in the advertise signal from the external apparatus.

15. The method for controlling the communication apparatus according to claim 9, wherein whether the external apparatus supports the predetermined protocol is determined on the basis of information that is included in the advertise signal from the external apparatus and that indicates a model of the external apparatus.

16. The method for controlling the communication apparatus according to claim 9, wherein whether the external apparatus supports the predetermined protocol is determined on the basis of whether predetermined information is included in the advertise signal from the external apparatus.

17. A non-transitory computer-readable storage medium which stores a program for causing a communication apparatus, which comprises a first communication unit configured to receive an advertise signal from an external apparatus, a second communication unit configured to wirelessly communicate with the external apparatus by using a predetermined protocol, and a third communication unit configured to perform wireless communication with the external apparatus via a network, to execute a method comprising:
determining whether the external apparatus supports the predetermined protocol on the basis of the advertise signal from the external apparatus;
if it is determined that the external apparatus does not support the predetermined protocol, performing control so that a request to start encrypted communication is sent to the external apparatus via the first communication unit;

if it is determined that the external apparatus supports the predetermined protocol, performing control so that a request to start unencrypted communication is sent to the external apparatus via the first communication unit,
if it is determined that the external apparatus does not support the predetermined protocol, sharing an identifier of the network with the external apparatus by using encrypted communication via the first communication unit; and
if it is determined that the external apparatus supports the predetermined protocol, sharing the identifier of the network with the external apparatus by using encrypted communication via the second communication unit.

* * * * *